United States Patent [19]

Miller

[11] 4,113,325
[45] Sep. 12, 1978

[54] SUPPORTING DEVICE
[75] Inventor: Helmut Miller, Niederrohrdorf, Switzerland
[73] Assignee: Escher Wyss Limited, Zurich, Switzerland
[21] Appl. No.: 744,319
[22] Filed: Nov. 23, 1976
[30] Foreign Application Priority Data Dec. 2, 1975 [CH] Switzerland ............... 15606/75

[51] Int. Cl.² ............................................. F16C 32/06
[52] U.S. Cl. ............................................................ 308/9
[58] Field of Search ................. 308/9, 35, 72, 73, 5 R, 308/122, DIG. 1; 29/113 AD, 116 AD; 184/5; 248/20, 358 R; 188/299

[56] References Cited

U.S. PATENT DOCUMENTS

| 1,565,770 | 12/1925 | Almesan | 188/299 |
|---|---|---|---|
| 3,658,393 | 4/1972 | Luthi | 308/9 |
| 3,778,182 | 12/1973 | Hohn et al. | 308/9 |
| 3,791,703 | 2/1974 | Ifield | 308/9 |
| 3,994,367 | 11/1976 | Christ | 308/9 |

Primary Examiner—Trygve M. Blix
Assistant Examiner—Charles E. Frankfort
Attorney, Agent, or Firm—Robert A. Ostmann

[57] ABSTRACT

A supporting device for a mobile part which is subjected to dynamic forces relieves the normal support bearings of the necessity of handling these unusual loads. The device comprises a support element which adjoins the mobile part, and a hydraulic control which causes that element to supply a constant, relatively small supporting reaction under normal conditions, which may produce slow displacements of the mobile part, and to supply an increased or decreased reaction, depending upon the direction of movement, when the mobile part is displaced rapidly by the dynamic forces.

8 Claims, 6 Drawing Figures

SUPPORTING DEVICE

BACKGROUND AND SUMMARY OF THE INVENTION

The present invention relates to a device for supporting a mobile part which moves relatively to a loadbearing part.

In prime movers and driven machines, for example, water turbines and pumps, the mobile part comprises the shaft of the rotor, and it usually is mounted in two or more bearings. In the past, these bearings have been so dimensioned that they can accept the forces which occur during normal operation and also the dynamic forces which are encountered occasionally. These dynamic forces occur, for example, during starting and stopping of the machine and when changing between driving and driven modes of operation, and they may be a multiple of the normal forces. Therefore, the bearings must be very rigidly constructed. As a result, powerful forces caused by temperature fluctuations can be developed in the bearings, and these too may have a magnitude which is a multiple of the normal bearing loads.

The object of this invention is to provide an improved mounting arrangement for the mobile part which permits the use of bearings which are dimensioned to accept substantially only the forces encountered during normal operation. According to the invention, this object is achieved by providing a supporting device which includes a support element which adjoins the mobile part and is oriented to accept the dynamic forces, and a hydraulic control means which responds to the rate of displacement of the support element and serves to vary the supporting force it furnishes. Under normal operating conditions, which may produce slow displacements, the support reaction is constant and relatively small. However, when a rapid displacement occurs, the reaction is substantially increased or decreased, depending upon the direction of movement. The new supporting device is not a bearing in the true sense of the word, because it performs no substantial supporting function unless the mobile part is suddenly displaced. However, since it does accept the dynamic forces when they occur, it relieves the true bearings of this burden and allows them to utilize an elastic construction. Therefore, the bearings are simpler, and consequently less expensive, to construct, and, since they are subjected to less intensive stress, they will operate more reliably.

The hydraulic control means employed in the supporting device comprises a positive displacement control motor having a movable control element which responds to the pressure in a working space which is connected with a constant pressure source via a throttled conduit. The control element is subjected to a constant pressure force as long as it moves slowly and does not change the volume of the working space at a rate which exceeds the flow capacity of the throttled conduit. However, when that element is moved rapidly, the pressure in the working space, and consequently the force developed on the movable element, will rise or fall drastically, depending upon the direction of movement. The control element of the control motor is coupled with the support element in such manner that their movements tend to correspond, and the pressure force acting on the control element determines the reaction furnished to the mobile part by the support element. Various arrangements of the components are possible. For example, in one embodiment, the support element is a hydrodynamically lubricated bearing segment, and that segment is carried directly by the movable element of the control motor. In other embodiments, the support element is a hydrostatic supporting piston which carries the mobile part without physical contact and which is urged toward that part by its own hydraulic supporting motor. In these versions of the invention, the control element is indirectly coupled with the support element, either through a spring which reacts between them, or through a valve which serves to alter the pressure in the supporting motor and has coacting members actuated, respectively, by the two elements. Regardless of which construction is employed, the throttled conduit of the control means may include a shut-off valve which can be closed to hydraulically lock the control element of the control motor, and thus prevent reestablishment of the normal support reaction, in situations, such as change-over operations, where the dynamic forces act over a relatively long period of time.

BRIEF DESCRIPTION OF THE DRAWINGS

Several embodiments of the invention are described herein in detail with reference to the accompanying drawings, which contain simplified schematic illustrations and in which.

DESCRIPTION OF THE ILLUSTRATED EMBODIMENTS

Figure 1:
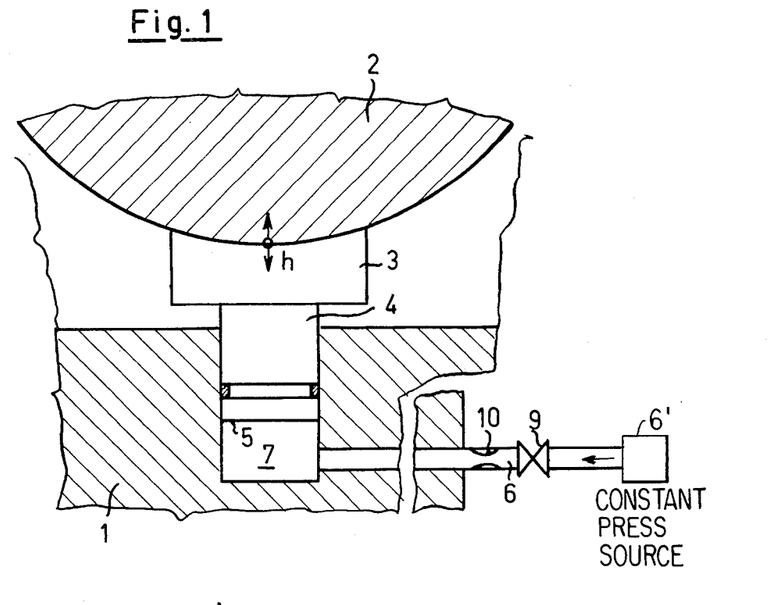
FIG. 1 is a cross sectional view of one version of the supporting device.

As shown in FIG. 1, the first version of the supporting device is mounted in a load-bearing part 1 and associated with a mobile part 2, which may, for example, be the shaft of a rotary machine. Mobile part 2 is supported by suitable bearings (not shown), such as known hydrodynamic bearing segments, which accept in the usual way the forces which occur during normal operation.

The supporting device provided by the invention comprises a bearing segment 3 which adjoins part 2 and is connected directly to one end of the piston 4 of a hydraulic control motor. Segment 3 is surrounded by a lubricant, so a hydrodynamic lubricant film is formed between this member and mobile part 2. The opposite end 5 of piston 4 is subjected to the pressure in the working space 7 of the control motor, and, therefore, that pressure determines the support reaction of segment 3. Working space 7 is connected with a source 6' of hydraulic fluid at constant pressure via a conduit 6 containing a shut-off valve 9 (e.g. a magnetically operated valve) and a throttling element 10, which may be in the form of a control orifice.

Figure 1A:
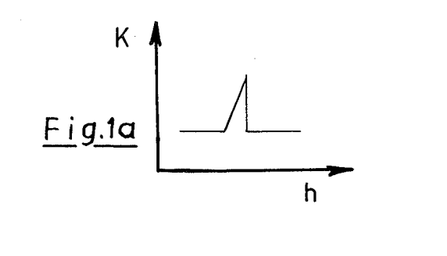
FIG. 1a is a graph showing the force-travel characteristic of the supporting device.

In normal operation, valve 9 is open, and piston 4 urges segment 3 toward mobile part 2 with a constant, relatively small force determined by the output pressure of source 6'. Since conduit 6 provides continuous communication between source 6' and working space 7, hydraulic fluid may be transferred freely to and from space 7 as needed to accommodate movement of piston 4, provided, of course, that the rate of transfer does not exceed the flow capacity of throttling element 10. Therefore, segment 3 and piston 4 can follow slow up and down movement of mobile part 2 in direction $h$, and the support reaction provided by segment 3 will remain constant. However, if mobile part 2 is moved downward suddenly by a dynamic force, segment 3 and piston 4 will lag behind, because throttling element 7 will restrict displacement of fluid from working space 7. As a result, the pressure in space 7 will rise (see the upwardly sloping portion of the curve of FIG. 1a), and piston 4 will cause segment 3 to furnish an increased supporting reaction. Similarly, if the dynamic force causes rapid upward movement of mobile part 2, throttling element 10 will restrict delivery of fluid to working space 7, thereby effecting a decrease in the pressure in that space, and a corresponding decrease in the support reaction, and again causing parts 3 and 4 to lag movement of mobile part 2.

The change in the support reaction produced by throttling element 10 is a transient effect. Therefore, when dynamic forces of relatively long duration are expected, as, for example, during the change-over from driving to driven conditions, shut-off valve 9 is closed before those forces occur. Since closure of this valve precludes escape of fluid from working space 7, the support device serves not only to damp motion of mobile part 2, but also to positively hold that part in its original position in spite of the imposition of prolonged downwardly directed dynamic forces.

Figure 2:
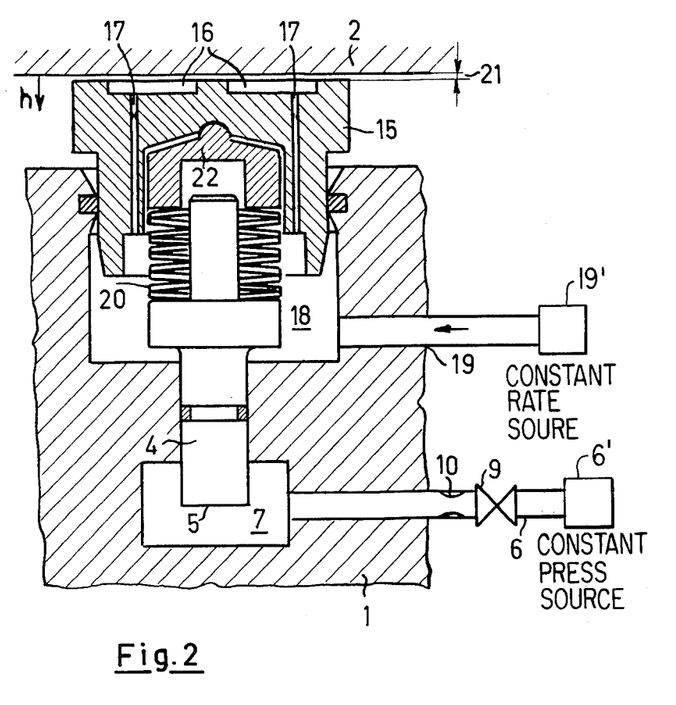
FIGS. 2-5 are cross sectional views similar to FIG. 1 depicting four other versions of the supporting device.

Referring now to FIG. 2, the second embodiment of the invention employs a support element in the form of a hydrostatic supporting piston 15, which carries mobile part 2 on a pressure cushion and without physical contact. The bearing face of piston 15 contains four bearing pockets 16 (only two of which appear in the drawing), which communicate with the pressure chamber 18 of an associated hydraulic supporting motor by way of throttled passages 17. Chamber 18, in turn, is connected by duct 19 with a source 19' of hydraulic fluid under pressure. This source 19' is separate from the source 6' which supplies control motor 4, 7 and delivers fluid at a constant rate, i.e., a constant volume per unit of time. The control motor of the FIG. 2 embodiment is pressurized in the same way as its counterpart in the first embodiment, but, in this version of the invention, the upper end of control piston 4 is exposed to the pressure in chamber 18 and develops a force which opposes that developed on end 5 by the pressure in working space 7. Moreover, the control piston here is coupled indirectly with the support element 15 via a cup spring assembly 20 and an associated seating element 22. The arrangement is such that spring assembly 20 is preloaded by the differential pressure force which is developed on control piston 4.

In normal operation of the FIG. 2 embodiment, the hydraulic fluid delivered to pressure chamber 18 by source 19' flows through throttled passages 17 to pockets 16, and then escapes from those pockets through a gap 21 between the bearing face of piston 15 and mobile part 2. Supporting piston 15 is urged toward mobile part 2 by the pressure in chamber 18, which is a function of the rate of flow, and by the preload in spring 20, which is a function of the difference between the pressures in chamber 18 and working space 7, and is urged in the opposite direction by the pressure in pockets 16, which, of course, depends upon the rate of flow and the width of gap 21. Since source 6' delivers fluid at a constant rate, it follows that supporting piston 15 normally will assume a stable position relative to mobile part 2 (i.e., gap 21 will have a constant, predetermined width), and that the forces acting on this piston and on piston 4 will be in equilibrium. As a result, the pressure in the fluid cushion between piston 15 and mobile part 2, and consequently the supporting reaction provided by the supporting device, will be constant.

If mobile part 2 is displaced slowly in the downward direction, initially there will be a slight reduction in the width of gap 21 and a small increase in the pressure in pockets 16. In response to this pressure change, supporting piston 15 will move downward and tend to compress spring 20. However, since any deflection of the spring will unbalance the forces acting on control piston 4, the control piston will move downward as needed to maintain the original preload in spring 20. In other words, the pistons 4 and 15 and the spring assembly 20 move down as a unit. As a result, the width of gap 21 is kept constant, and the supporting force applied to mobile part 2 remains substantially unchanged.

Slow upward movement of mobile part 2 is accommodated in a similar fashion. Movement in this direction momentarily increases the width of gap 21 and reduces the pressures in pockets 16. As a result, control piston 4 moves upward with supporting piston 15 and again prevents any change in the preload in spring 20. The parts will come to rest when gap width, and the pressure in the supporting cushion, have been restored to their original values.

If the mobile part 2 of the FIG. 2 embodiment is displaced suddenly, control piston 4 will not be able to follow the accompanying movement of supporting piston 15, because, as in the first embodiment, throttling element 10 limits the speed at which it may move. As a result, movement of supporting piston 15 will be accompanied by deflection of spring 20, and a change in the spring load, and thus will not serve to restore gap width and supporting pressure to their original values. In particular, sudden downward displacement will effect compression of spring 20, and the establishment of a smaller gap and a greater cushion pressure, and sudden displacement in the opposite direction will effect expansion of spring 20 and the establishment of a larger gap and a smaller supporting pressure.

As in the case of the first embodiment, the change in the support reaction produced by the FIG. 2 construction is a transient effect. Therefore, when dynamic forces of relatively long duration are expected, shut-off valve 9 is closed before those forces occur.

Figure 3:
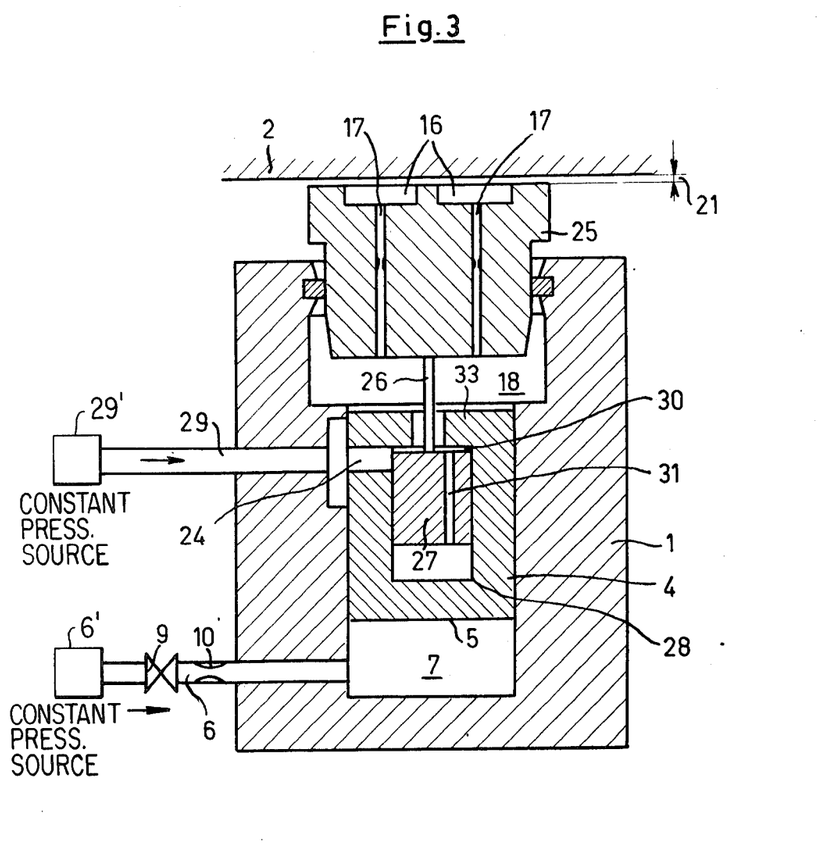

The embodiment depicted in FIG. 3 employs a hydrostatic supporting piston 25 similar to the piston 15 of FIG. 2, but in this case the supporting piston is coupled indirectly which control piston 4 through a valve which serves to alter the pressure in chamber 18 of the supporting motor. Referring to FIG. 3, supporting piston 25 is connected by a thin, flexible rod 26 with a valve element 27 which slides in a cylindrical recess 28 formed in control piston 4. Recess 28 is bounded at its upper end by a shoulder 33 which limits upward movement of element 27 relatively to piston 4. Just below shoulder 33, piston 4 is provided with a radial bore 24 which is in constant communication with a conduit 29 leading to a source 29' of hydraulic fluid for the supporting motor of piston 25. Source 29' is separate from the source 6' associated with control motor 4, 7 and delivers fluid at a constant, higher pressure. Element 27 and bore 24 define a throttle valve in the flow path connecting source 29' with pressure chamber 18, and a recess 30 formed in the upper face of element 27 insures that this path never is completely closed. Element 27 also is provided with a through longitudinal bore 31 which serves to equalize the pressures acting on its opposite ends.

Under normal conditions, the hydraulic fluid supplied by source 29' flows to pressure chamber 18 via conduit 29, radial bore 24 and recess 30, then is conveyed to pockets 16 through throttled passages 17, and finally escapes from those pockets through the gap 21. The pressure in chamber 18 is higher than the pressure in working space 7 of the control motor, so control piston 4 is biased downward to maintain shoulder 33 in engagement with valve element 27. As a result, the throttling effect at bore 24 is a maximum, and the differential pressure force acting on piston 4 is applied to supporting piston 25 through element 27 and connecting rod 26. This force, which normally is constant, opposes the larger, and also normally constant, force developed on piston 25 by the pressure in chamber 18. The difference between these forces must be balanced by the force developed on the upper end of piston 25 by the pressure in the fluid cushion which supports mobile part 2. Therefore, the last mentioned pressure, and the supporting force applied to mobile part 2, also will be constant.

When the mobile part 2 of FIG. 3 is displaced slowly in the downward direction, gap 21 narrows slightly, the pressure in pockets 16 increases, and the forces acting on supporting piston 25 are unbalanced in the downward direction. This change necessarily reduces the reaction applied to control piston 4 through valve element 27 and shoulder 33, so the forces acting on this piston also are unbalanced in the downward direction. Therefore, as mobile part 2 is displaced downward the pistons 4 and 25 move as a unit and follow. As in the FIG. 2 embodiment, the parts come to rest when gap width and supporting pressure are restored to their original values.

Slow upward displacement of mobile part 2 also is accommodated without any substantial change in the reaction of the support device. In this case, the width of gap 21 increases, the pressure in pockets 16 momentarily decreases, and the pistons 4 and 25 move upward as a unit to restore the original supporting conditions.

In the event the mobile part 2 of FIG. 3 is suddenly displaced in the upward direction, supporting piston 25 will lag behind. The reason for this is that any sudden upward movement of control piston 4 will, because of the action of throttling element 10, quickly dissipate the pressure in working space 7, and thereby effect a drastic increase in the downwardly directed differential pressure force acting on that piston. Since control piston 4 is coupled with supporting piston 25 through shoulder 33, valve element 27 and rod 26, it follows that the downward bias on piston 4 effectively prevents rapid upward movement of piston 25. In this situation, therefore, the support device will furnish to mobile part 2 a reduced supporting force.

Rapid downward displacement of mobile part 2 produces the opposite result. In this case, throttling element 10 acts to retard movement of only piston 4; therefore, as supporting piston 25 moves in the downward direction under the influence of the increased pressure in pockets 16, valve element 27 will move down relatively to bore 24 and thereby decrease the flow restriction in the supply path to pressure chamber 18. As a result, the pressure in chamber 18 will increase. The change in the throttling effect at bore 24 will be such that the pressure in chamber 18 is raised to that level required for the supporting motor to balance the downwardly directed force acting on the upper end of support piston 25. Therefore, piston 25 will not follow movement of mobile part 2 and restore gap 21 to its original size, as in the case of slow displacements of part 2, but will allow gap width to be reduced and establish a higher pressure in the supporting fluid cushion. In other words, as in the other embodiments, the FIG. 3 supporting device applies an increased reaction to mobile part 2 when the latter is suddenly displaced downward. As before, the shut-off valve 9 of this embodiment is closed, to thereby insure continuation of the increased reaction, in situations where prolonged dynamic forces are expected.

Figure 4:
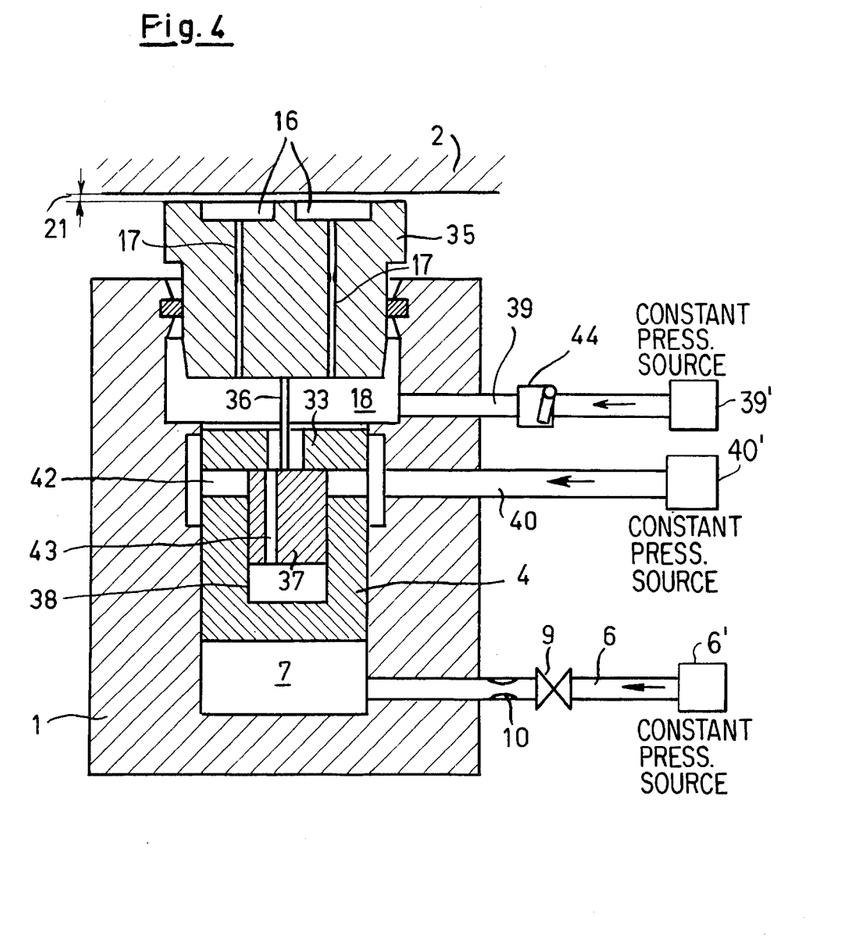

The embodiment of FIG. 4 is similar to the one shown in FIG. 3, in that its control piston 4 is coupled indirectly with the hydrostatic supporting piston 35 by a valve which serves to raise the pressure in chamber 18 of the supporting motor when mobile part 2 is suddenly displaced downward. However, in this case, chamber 18 has two separate supply circuits. One circuit comprises a duct 39 which leads directly from chamber 18 to an independent source 39' of hydraulic fluid, and which is equipped with a check valve 44 oriented to permit flow toward, but not away from, the chamber. Source 39' may deliver fluid at a constant rate, but preferably delivers fluid at a constant pressure. In any event, this source normally maintains chamber 18 at a higher pressure than that established in working space 7 by source 6'. The second supply circuit for chamber 18 comprises a third independent source 40' of hydraulic fluid which is connected with the chamber via duct 40 and the control valve in piston 4. Source 40' also is a constant pressure source, but its pressure level is substantially higher than the output pressures of sources 6' and 39'. Supply duct 40 delivers fluid to chamber 18 through radial bores 42 in piston 4, under the control of the valve element 37 which slides in cylindrical recess 38. As in FIG. 3, element 37 is attached to supporting piston 35 by a thin rod 36, contains a pressure-equalizing passage 43, and is provided with a limit stop in the form of a shoulder 33 located at the upper end of recess 38. However, in contrast to its FIG. 3 counterpart, valve element 37 has no flow path corresponding to recess 30, and therefore, under normal conditions, it serves to block all flow from source 40' to pressure chamber 18.

During operation, the fluid supplied by source 39' circulates through chamber 18, throttled passages 17, pockets 16 and gap 21, and thus develops on supporting piston 35 oppositely directed pressure forces. The pressure in chamber 18 also acts on control piston 4 in opposition to the pressure in working space 7, and, as in FIG. 3, the control piston is subjected to a net downward directed force which keeps shoulder 33 in engagement with valve element 37, and which is applied to supporting piston 35 via rod 36. Since the pressure in space 7 and chamber 18 normally are constant, the apparatus establishes a gap 21 having a width just sufficient to create in pockets 16 the pressure necessary to equalize the forces acting on the pistons 4 and 35. As a result, the supporting device applies a constant supporting force to mobile part 2.

When mobile part 2 is displaced, the width of gap 21, and the pressure in pockets 16, will change. If the displacement occurs at a slow speed, these changes will last only momentarily, because pistons 4 and 35 will move as a unit and quickly restore gap width and supporting pressure to their original values. On the other hand, when part 2 is displaced rapidly, pistons 4 and 35 will lag behind and a noticeable change in supporting pressure will occur. If that displacement is in the upward direction, any tendency of the pistons 4 and 35 to follow will cause the downwardly directed pressure force acting on the control piston to increase at a greater rate than the upwardly directed pressure force acting on the supporting piston. Therefore, piston 4, acting through shoulder 33, valve element 37 and rod 36, will prevent piston 35 from keeping pace with part 2, and thus permit an increase in gap width and a corresponding decrease in the pressure in the supporting cushion. If mobile part 2 is displaced rapidly in the downward direction, supporting piston 35 will move down relatively to control piston 4 and cause valve element 37 to uncover radial bores 42. This action opens the supply path leading from source 40' to chamber 18. Since the output pressure of source 40' is substantially higher than the output pressure of source 39', and check valve 44 prevents flow from chamber 18 to source 39', the pressure in chamber 18 now increases. As in FIG. 3, the increase enables the supporting motor to balance the force developed on the upper end of piston 35 by the pressure in pockets 16. Therefore, piston 35 does not follow movement of mobile part 2 and restore original conditions, but, on the contrary, it permits a reduction in the width of gap 21, and a corresponding increase in supporting pressure. As before, rapid displacements of relatively long duration can be accommodated by closing shut-off valve 9.

Figure 5:
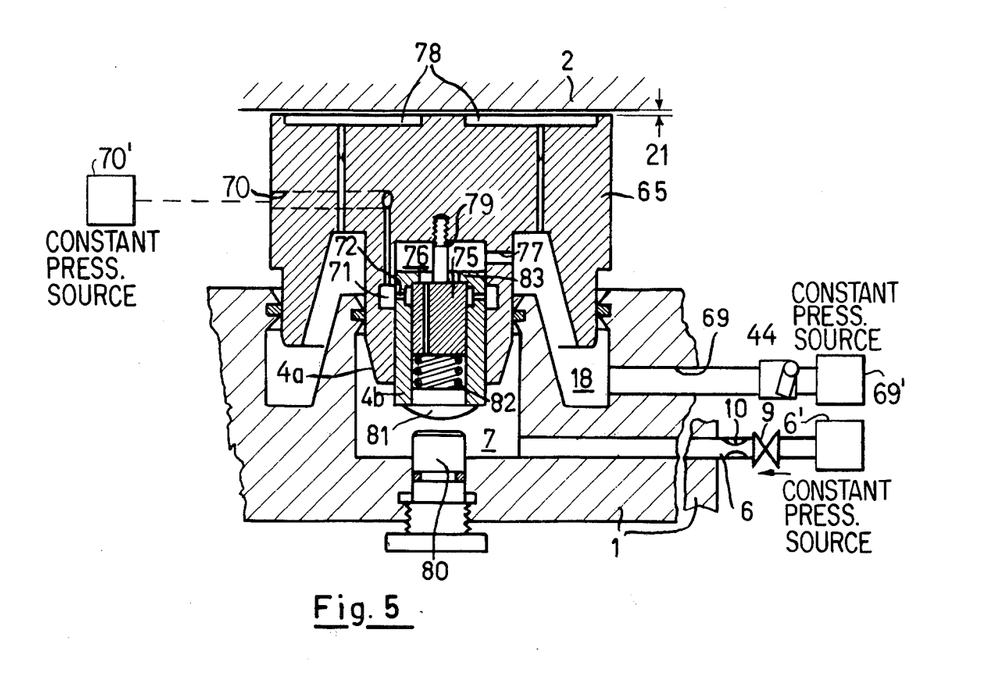

The final embodiment, shown in FIG. 5, is a hybrid, in that it incorporates features of both the FIG. 1 embodiment and the FIG. 4 embodiment. In particular, it will be noted that the control motor of FIG. 5 has two movable pistons 4a and 4b; the piston 4a being connected directly with the supporting piston 65, and thus acting in the manner of the control piston 4 of FIG. 1, and the piston 4b being coupled with the supporting piston 65 through a control valve which serves to change the pressure in chamber 18 of the supporting motor in the same way as the control valve of FIG. 4. Control piston 4b is mounted in supporting piston 65, rather than in load-bearing part 1, as in the other versions of the invention. Therefore, as supporting piston 65 tilts to accommodate oblique positions of mobile part 2, it carries with it control piston 4b and the coacting valve element 75. As a result, a rigid (i.e., non-flexible) rod 79 can be used to attach element 75 to supporting piston 65.

The high pressure hydraulic fluid used to develop the increased support reaction in FIG. 5 is supplied by a source 70' and delivered to the radial bores 72 in control piston 4b via a duct 70 and an annular groove 71 formed in piston 65. When the control valve opens, this fluid is conveyed to chamber 18 via chamber 76 and a bore 77. Since chambers 76 and 18 are in constant communication with each other, the pressures in chambers 7 and 18 develop opposing forces on control piston 4b, and the latter normally is biased downward to the position in which shoulder 83 abuts valve element 75. Supplemental bias in the same direction is supplied by a compression spring 82.

Downward movement of control piston 4b relatively to load-bearing part 1 is limited by an adjustable stop 80. Since, as mentioned above, piston 4b tilts with supporting piston 65, piston 4b includes a mushroom-shaped end cap 81, which serves as the reaction element for stop 80.

Under normal operating conditions, supporting piston 65 of FIG. 5 is urged toward mobile part 2 by the pressure in working space 7, which acts on control piston 4a, and by the pressure in chambers 18 and 76, and is urged in the opposite direction by the pressure in pockets 78 and by the differential pressure force which is developed on control piston 4b and is applied to the support piston through shoulder 83, valve element 75 and rod 79. Since the pressures in space 7 and in chambers 18 and 76 are constant, and support piston 65 always tends to size gap 21 as needed to create a pressure in pockets 78 which results in a state of equilibrium, the FIG. 5 support device also affords a constant reaction under normal conditions. Moreover, in view of the descriptions of earlier embodiments, it should be evident that the magnitude of the support reaction is not altered by slow displacements of mobile part 2.

If mobile part 2 suddenly moves upward, support piston 65 will tend to follow, but, as before, this tendency will, because of throttling element 10, result in a substantial decrease in the pressure in working space 7. This change results in a reduction in the upward directed force developed on control piston 4a, as well as in an increase in the downward directed differential pressure force developed on control piston 4b and transmitted to piston 65 via rod 79. As a result, piston 65 will lag behind, gap 21 will widen, and the pressure in the supporting cushion for part 2 will decrease. Supporting piston 65 also will attempt to follow sudden downward movement of part 2, but, in this case, that tendency produces a drastic increase in the pressure in working space 7. This change has two effects. First, it increases the pressure force acting on control piston 4a, and, therefore, that element is effective immediately and directly to retard downward movement of support piston 65. Second, the sudden increase in pressure in space 7 reverses the sense of the net pressure force acting on control piston 4b and causes upward movement of that part relatively to valve element 75. This action opens radial bores 72 and allows the fluid supplied by source 70' to pass into chambers 76 and 18. Since check valve 44 blocks flow from these chambers to source 69', and the output pressure of source 70' is higher than the output pressure of source 69', the supporting motor now also acts to retard downward movement of piston 65. The two effects just mentioned prevent support piston 65 from following mobile part 2. As a result, gap 21 will be allowed to decrease, and the pressure of the supporting cushion provided by pockets 78 will increase.

I claim:

1. Apparatus for supporting a mobile part which moves relatively to a load-bearing part and which is subjected to dynamic forces, the apparatus comprising
   a. a hydrostatic support device including a supporting piston containing at least one pressure pocket which opens toward the mobile part, a hydraulic supporting motor having a pressure chamber and which urges the supporting piston toward the mobile part, and a throttled passage connecting the pressure chamber with the pocket;
   b. first and second sources of hydraulic fluid at constant pressure connected with the pressure chamber by first and second supply passages, respectively, the second source having a higher pressure level than the first; and
   c. hydraulic control means which responds to the rate of displacement of the supporting piston and which allows only the first source to pressurize the pressure chamber under static conditions and during slow displacements, and allows only the second source to pressurize the pressure chamber when the piston is displaced rapidly in the direction which reduces pressure chamber volume,
d. whereby the supporting piston furnishes a constant, relatively small reaction under normal conditions, and a larger reaction when said rapid displacement occurs.

2. Apparatus as defined in claim 1 in which said hydraulic control means comprises
a. control valve means which normally closes the second supply passage;
b. hydraulic means for opening the control valve means when said rapid displacement of the supporting piston takes place; and
c. a check valve interposed in the first supply passage and oriented to prevent flow from the pressure chamber toward the first source.

3. Apparatus as defined in claim 1 in which said hydraulic control means comprises
a. a positive displacement hydraulic control motor having a working space and a movable control element which responds to the pressure in that space;
b. a third source of hydraulic fluid which delivers fluid at a constant pressure lower than that provided by the first source and is connected with the working space by a throttled conduit;
c. a control valve for controlling flow through the second supply passage to the pressure chamber and comprising cooperating relatively movable valving members fixed, respectively, to the supporting piston and the control element, the valving members having a normal relative position defined by coacting stop surfaces carried, respectively, by the control element and the supporting piston and in which flow to the pressure chamber is blocked, and being movable from that position in one relative direction to increase flow to the pressure chamber;
d. oppositely directed surfaces on the control element subject, respectively, to the pressures in the working space and the pressure chamber and which develop a net force which normally urges the control element to a position in which said stop surfaces are in abutment, the stop surfaces being so arranged that, when they abut, said net force acts on the supporting piston in opposition to the hydraulic supporting motor; and
e. a check valve interposed in the first supply passage and oriented to prevent flow from the pressure chamber toward the first source.

4. Apparatus as defined in claim 3 which includes a shut-off valve which selectively opens and closes said throttled conduit.

5. Apparatus as defined in claim 3 which includes an adjustable stop for limiting movement of the control element toward the working space.

6. Apparatus as defined in claim 3 in which
a. the control element is guided for movement by the load-bearing part;
b. the supporting piston is mounted for tilting movement relatively to the load-bearing part; and
c. the supporting piston is fixed to one of the valving members by a flexible connector.

7. Apparatus as defined in claim 3 in which
a. said movable control element is guided for movement by the supporting piston; and
b. the control motor includes a second movable control element which responds to the pressure in the working space and is fixed to the supporting piston.

8. Apparatus as defined in claim 7 in which
a. the supporting piston is mounted for tilting movement relatively to the load-bearing part; and
b. the supporting piston is fixed to one of the valving members by a rigid, non-flexible connector.

* * * * *